United States Patent
Ward et al.

(10) Patent No.: US 6,439,221 B1
(45) Date of Patent: Aug. 27, 2002

(54) METHOD AND APPARATUS FOR PROVIDING A PORTABLE PREASSEMBLED GRILL

(75) Inventors: Eric A. Ward, Telford; Steven A. Buono; Jeffery G. Fox, both of Greeneville; Claude N. Smelcer, Parrottsville, all of TN (US)

(73) Assignee: Meco Corporation, Greeneville, TN (US)

( * ) Notice: Subject to any disclaimer, the term of this patent is extended or adjusted under 35 U.S.C. 154(b) by 0 days.

(21) Appl. No.: 09/671,093

(22) Filed: Sep. 27, 2000

(51) Int. Cl.[7] .................. F24B 3/00; F24C 1/16
(52) U.S. Cl. ..................... 126/25 R; 126/9 R
(58) Field of Search ............... 126/25 R, 41 R, 126/9 R, 9 B, 38, 59, 153, 276, 25 A; 99/339, 340, 449

(56) References Cited

U.S. PATENT DOCUMENTS

| | | |
|---|---|---|
| 1,273,840 A | 7/1918 | Fassett |
| 1,309,049 A | 7/1919 | Syrett |
| 2,515,521 A | 7/1950 | Loffredo ................... 126/9 |
| 2,597,477 A | 5/1952 | Haislip ................... 126/25 |
| 2,663,391 A | 12/1953 | Kuhns ................... 190/12 |
| 2,787,996 A | 4/1957 | Rumsey ................. 126/25 R |
| 3,025,849 A | 3/1962 | Zimmerman ............. 126/43 |
| 3,200,806 A | 8/1965 | Goldstein ................ 126/25 |
| 3,297,016 A * | 1/1967 | Rhodes ................. 126/9 R |
| 3,386,430 A * | 6/1968 | Linstead ................ 126/25 A |
| 3,447,530 A | 6/1969 | Santeramo ............... 126/25 |
| 3,452,736 A | 7/1969 | Harff et al. .............. 126/25 |
| 3,556,076 A | 1/1971 | Freeport, III ............ 126/9 |
| 3,611,912 A | 10/1971 | Choc ................... 99/339 |
| 3,692,013 A * | 9/1972 | Grafton et al. .......... 126/41 R |
| 3,812,840 A * | 5/1974 | Whaler ................ 126/25 R |
| 4,026,266 A | 5/1977 | Cremer ................ 126/25 A |
| 4,210,118 A * | 7/1980 | Davis et al. ............. 126/9 R |
| 4,334,516 A | 6/1982 | Dittermer et al. ......... 126/9 R |
| 4,488,535 A | 12/1984 | Johnson ............... 126/25 A |
| 4,492,215 A | 1/1985 | DiGianvittorio .......... 126/9 R |
| 4,621,608 A | 11/1986 | Lee .................... 126/9 R |
| 4,706,817 A | 11/1987 | Greathouse ............. 206/545 |
| 4,836,179 A | 6/1989 | Schlosser et al. ........ 126/25 R |
| 5,105,726 A | 4/1992 | Lisker ................... 99/340 |
| 5,163,414 A | 11/1992 | Haynes, Jr. ............ 126/25 R |
| 5,174,197 A | 12/1992 | Upton .................. 99/449 |
| 5,317,961 A | 6/1994 | Shinler ................. 99/449 |
| 5,318,322 A | 6/1994 | Home .................. 280/645 |
| 5,423,308 A | 6/1995 | Huang et al. ............. 126/38 |
| 5,605,142 A | 2/1997 | Parker ................. 126/9 B |
| 5,836,295 A | 11/1998 | Faraj .................. 126/25 R |
| 5,906,196 A | 5/1999 | Measom ............... 126/304 A |
| 5,947,007 A | 9/1999 | O'Grady et al. .......... 99/340 |
| 6,205,912 B1 * | 3/2001 | Chiu .................. 126/25 R |

FOREIGN PATENT DOCUMENTS

| | | | |
|---|---|---|---|
| DE | 28 00 857 A1 | * | 7/1979 |
| EP | 0 625 327 A1 | | 11/1994 |

* cited by examiner

Primary Examiner—Henry Bennett
Assistant Examiner—Josiah C. Cocks
(74) Attorney, Agent, or Firm—Roberts, Abokhair & Mardula, LLC

(57) ABSTRACT

The present invention is drawn to a method and apparatus for providing a portable and 100% preassembled grill. More particularly, the invention is drawn to providing a grill having two pairs of pivoting legs that collapse to have wheels at one end and handle means at the other for easy shipping and consumer handling, but which assembles without tools. In a collapsed state, all of the support legs extend toward the rear of the grill and, in an erected state, an upper part of one pair of support legs is pivoted to the front of the grill and pivotally connected to the other set of legs at a central part. An upper part of this other set of legs engages a catch at a rear of the grill without tools to form a rigid, raised support base for the grill.

28 Claims, 5 Drawing Sheets

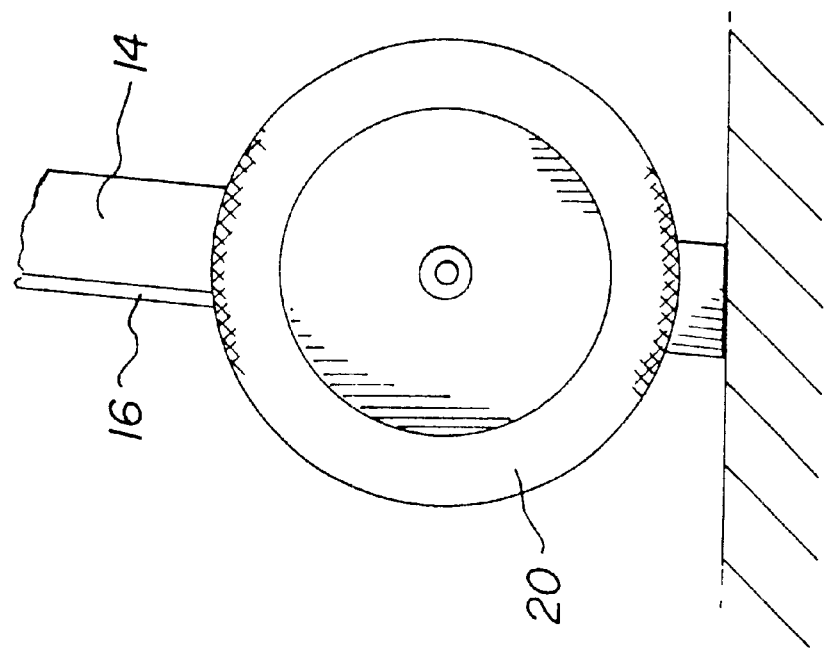
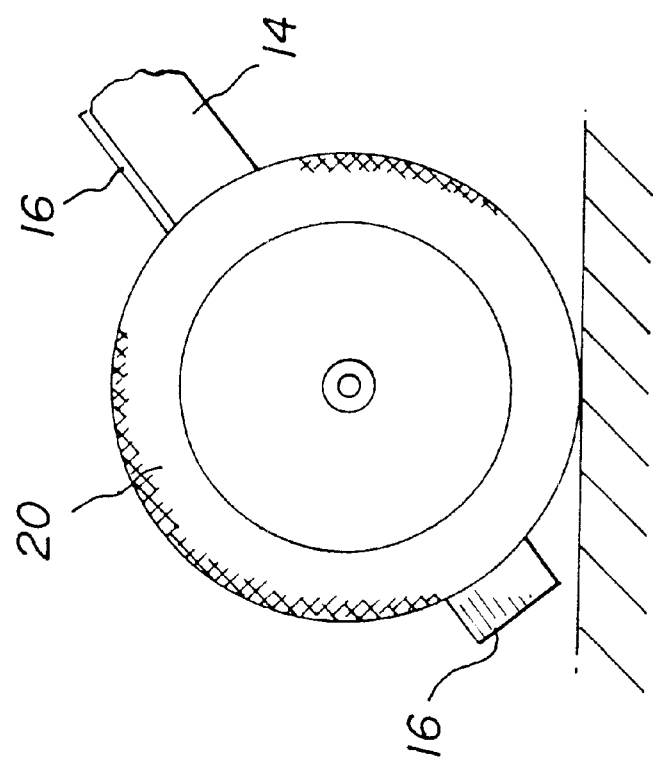

METHOD AND APPARATUS FOR PROVIDING A PORTABLE PREASSEMBLED GRILL

FIELD OF THE INVENTION

The present invention is to a method and apparatus for providing a portable preassembled grill. More particularly, the invention is drawn to providing a grill having two pairs of pivoting legs which collapse and have wheels at one end. The portable preassembled grill is configured for easy shipping, consumer handling, and storage by the consumer, but assembles without tools. The portable preassembled grill of the present invention provides the benefits of portability and storability for consumers.

BACKGROUND INFORMATION

Outdoor barbecue cooking continues to grow in popularity despite certain difficulties and inconveniences. An initial difficulty for consumers can be getting the grill home. Preassembled grills can be very bulky and difficult to transport at both the wholesale and consumer level. To address this, many grills are shipped unassembled or partially assembled. Although this solves part of the shipping problems, it causes other problems. If a consumer purchases a grill unassembled, the consumer can get the grill home, but then needs to perform the assembly.

If the consumer is not handy, assembly can often present insurmountable problems. Often, these people will therefore purchase assembled grills and then be confronted with the aforementioned transport problem. Sometimes these people will attempt to assemble the grill on their own, but discover they lack the required tools. If they have the tools, they may assemble the grill improperly, which can be especially dangerous with gas grills. If, perchance, they have the required tools and assemble it properly, it will usually take quite a bit of time and aggravation, and will delay grilling.

Handy consumers can usually assemble a grill properly, but are delayed from grilling during the assembly time.

Another difficulty faced by consumers is that outdoor barbecue cooking has increasingly expanded from the back yard to locations such as tailgate parties, beach outings, picnic outings, etc. that require the consumer to bring the grill with them. Although many portable grills exist, most have unacceptably small grilling surfaces, can be inconveniently short when in use because they lack full-sized legs, and/or can leave a mess in the consumer's vehicle.

All consumers must deal with the problem of grill storage. Although many grills fold for storage, most have only one or two of the common storage modes of (i) folding flat for prone storage, (ii) folding flat to hang on a wall, or (iii) folding flat and standing to lean against a wall.

And as a final difficulty, even those with room on their deck or in their backyard must deal with protecting their grills from the elements.

To address many of these problems, some consumers have opted for preassembled, portable camping or picnic-type grilling devices, such as U.S. Pat. Nos. 1,273,840, 1,309,049, 2,597,477, 3,025,849, 3,611,912, 4,334,516, 4,621,608, 4,706,817, 5,105,726, 5,174,197, 5,317,961, 5,423,308, 5,605,142, and 5,947,007 that use non-intersecting pivotally legs, or U.S. Pat. Nos. 2,515,521, 5,836,295, or 5,906,196 that use non-intersecting detachable or telescoping legs, or U.S. Pat. Nos. 3,447,530, 4,026,266, or 4,488,535 that can use intersecting legs. Although these grills will typically solve at least some of the transport, assembly and storage problems, they also will typically lack the functionality of a full-sized grill and can be bulky or difficult to handle when transporting from a vehicle to a cooking site.

A few full-sized grills have addressed these problems. U.S. Pat. No. 3,200,806 uses a relatively less stable three-leg arrangement wherein a pair of pivotally attached legs are themselves pivotally attached to an intersecting third leg, which is itself detachably connected to the grill body. The grill lacks means to prevent accidentally folding and the grill cannot be stored in a folded/standing position.

U.S. Pat. No. 3,452,736 discloses a knock-down type grill with separate legs and bowl (grill body).

U.S. Pat. No. 3,556,076 discloses a folding grill with crossed legs and wheels, wherein one pair of legs is pivotally attached to the grill body and pivotally fixed to the other pair of legs which are detachable from the grill body. The grill lacks means to prevent accidentally folding and the crossed-leg arrangement when folded is not the most compact (see FIG. 5 of the patent).

U.S. Pat. No. 4,210,118 discloses a system similar to U.S. Pat. No. 3,556,076 in which the legs are pivotally connected by an off-center link pin that "allows close collapsing of the legs in the folded condition." The tops of both sets of legs are pivotally connected to the grill, but an over-center link allows one set to partially swing away. It is unclear whether the grill can be hung-up or leaned against a wall for storage.

Commonly assigned U.S. Pat. No. 5,163,414 discloses a system similar to U.S. Pat. No. 3,556,076 with a snap-in cooking grill that stays in place when folded. It lacks wheels for transport and has no means for hanging-type storage.

U.S. Pat. No. 5,318,322 discloses a system similar to U.S. Pat. No. 3,556,076 in which the legs are pivotally connected. One pair releases at the top to fold into a crossed-leg arrangement. Again, there appears to be no means to prevent accidentally folding and the grill cannot be stored in a folded/standing position.

BRIEF SUMMARY OF THE INVENTION

It is an object of the invention to provide a portable preassembled grill that can be shipped and stored in a collapsed condition.

It is an object of the invention to provide a portable preassembled grill that can be transported in a collapsed condition.

It is an object of the invention to provide a portable preassembled grill with wheels and handles that can be easily moved in a collapsed condition.

It is a further object of the invention to provide a portable preassembled grill that can be erected very quickly without tools.

It is another object of the invention to provide a portable preassembled grill that cannot accidentally collapse after erection.

It is another object of the invention to provide a portable preassembled grill that is adapted for storage or display by hanging from a hook or the like.

It is another object of the invention to provide a portable preassembled grill that can be hung when collapsed from hooks of different sizes.

It is another object of the invention to provide a portable preassembled grill that can be stored when collapsed by standing it on a leg protrusion and leaning it against a wall.

It is another object of the invention to provide a portable preassembled grill that includes a hinged lid and means for retaining the grilling surface to accommodate storage.

It is another object of the invention to provide a portable preassembled grill that includes means to secure a lid to the grill body and means to secure the legs to the grill body to accommodate storage.

It is yet another object of the invention to provide a portable preassembled grill that can be easily stored inside a bag.

BRIEF DESCRIPTION OF THE DRAWINGS

Additional objects and advantages of the present invention will be apparent in the following detailed description read in conjunction with the accompanying drawing figures.

FIGS. 3A–3B disclose a second embodiment of the grill of the present invention that allows stationary upright storage.

DETAILED DESCRIPTION OF THE INVENTION

As used herein, the term "grill" is meant to encompass outdoor cooking grills, including, but not limited to, charcoal grills, gas grills, electric grills, solar grills, and wood pellet grills, of any shape that have an upwardly open grill body structure supporting a grilling surface. The terms "front," "rear," and "sides" as used herein relative to the grill body are for describing relative positions and are not meant as a limitation. For example, round grills might not have an actual front, rear, or sides, and for other shapes it would be well within the ability of one of ordinary skill in the art to rotationally reposition the grill body relative to the leg elements.

A primary feature of the present invention is that the grill is portable and can be easily transported and stored. This allows the grill to be used for tailgating, picnics, beach use, etc. When collapsed, a handle at one end and wheels at the other make it easy to transport. Nested legs help the grill fold very flat. The handle and a smaller loop on one of the leg elements increase the hanging storage options. Optionally, legs that extend slightly beyond the wheels when folded can allow the grill to be stored in an upright standing or leaning position. The variety of storage modes allows the grill of the present invention to be easily stored in garages, sheds, utility rooms, etc. by either laying flat, hanging, or leaning against a wall.

Another primary feature of the present invention is that the grill is 100% preassembled and requires no tools to erect. The present invention includes a grill having two pairs of pivoting legs that collapse to have wheels at one end and handle means at the other for easy shipping and consumer handling, but which provides for assembly without tools and cannot accidentally collapse after being erected.

Figure 1:
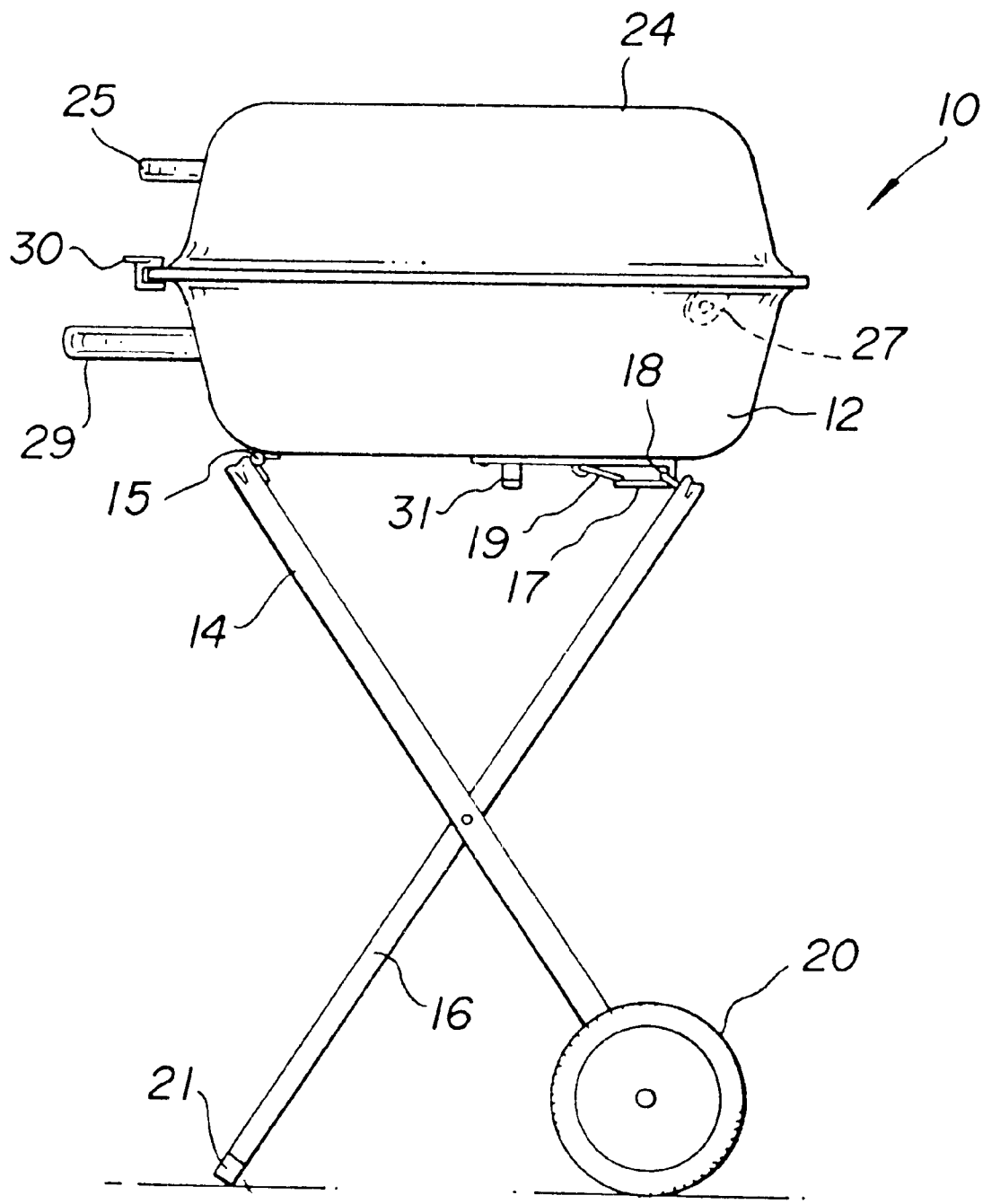
FIG. 1 discloses a first embodiment of the grill of the present invention in an erected condition.

FIG. 1 illustrates a first embodiment of portable preassembled grill 10. Grill body 12 is shown as generally square in shape, but may be any other shape used for grills, such, as, but not limited to, rectangular shapes, circular shapes, and combinations thereof. A first pair of support legs 14, formed generally as an inverted U-shape, are fixedly attached to the front portion of grill body 12 via a pivot 15 and extend toward the rear. The ends of legs 14 opposite the pivots hold a pair of wheels 20.

A second pair of support legs 16, formed generally as an inverted U-shape, are releasably attached to the rear portion of grill body 12 via a latch means, formed by a catch 17 and loop 18, and extend towards the front. The ends of legs 16 opposite the pivots can include end caps 21. Legs 16 are pivotally attached to legs 14 from the inside so that legs 16 can be folded inside legs 14, as shown in FIG. 2.

The grill can also include a lid 24 that is preferably hinged 27 to the grill body 12 so as not to become separated when the grill 10 is moved or hung up for merchandising or storage. The lid 24 can include a handle 25. Like the lid 24, it is also preferable that grilling surface (not shown) be attached to the grill body 12 in such a manner as to not be separated when the grill 10 is not horizontal.

The grill 10 is erected without the use of tools by having a loop 18 at the top of legs 16 engage catch 17. A gravity-activated gate 19 pivots down to prevent the accidental release and collapse. When collapsed, the legs 14 and 16 can be secured in place by a rotating storage latch 31 engaging a crossbar 28 (see FIG. 2) between legs 16. A handle 29 on the front of grill body 12 can be used for moving the grill 10 in both erected and collapsed conditions and has added utility for hanging the grill 10 from larger hooks for storage. A rotating latch 30 at the front of the grill 10 can be used to secure the front of hinged lid 24 to the grill body 12.

Figure 2:
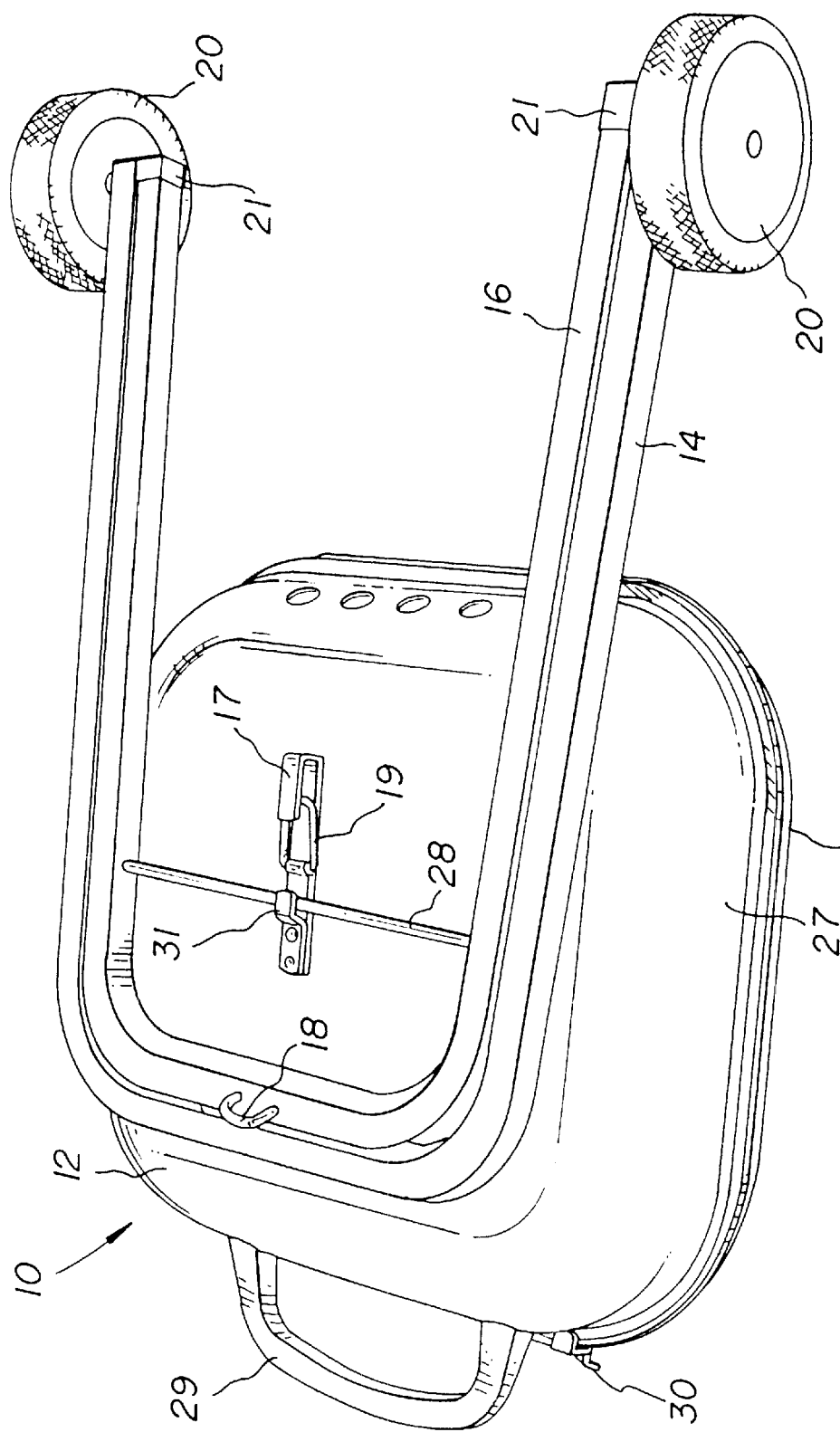
FIGS. 2 disclose a first embodiment of the grill of the present invention in a collapsed condition.

FIG. 2 shows grill 10 with storage latch 31 engaging crossbar 28 to secure the assembly in a collapsed condition, with wheels 20 at one end and handle 29 at the other. This configuration is compact for shipping, storage, or transport and is ideally suited for easily being transported by a single person by grabbing handle 29 and rolling the grill 10 to a desired location on wheels 20. It is also an ideal way for consumers to transport the grill 10 out of a retail location after purchasing the grill 10.

FIGS. 3A and 3B illustrate an alternate embodiment of portable preassembled grill 10 wherein legs 16 are designed to extend slightly beyond wheels 20. The grill rolls when tilted, as shown in FIG. 3A, but rests on legs 16 when positioned near an upright position, as shown in FIG. 3B.

The grill can also include a lid 24 that is preferably hinged to the grill body 12 so as not to become separated when the grill 10 is moved or hung up for merchandising or storage. The grilling surface (not shown) may or may not be attached to the grill body 12, but it is desirable that it be incorporated in such a manner so as to not be separated when the grill 10 is not horizontal.

Figure 4:
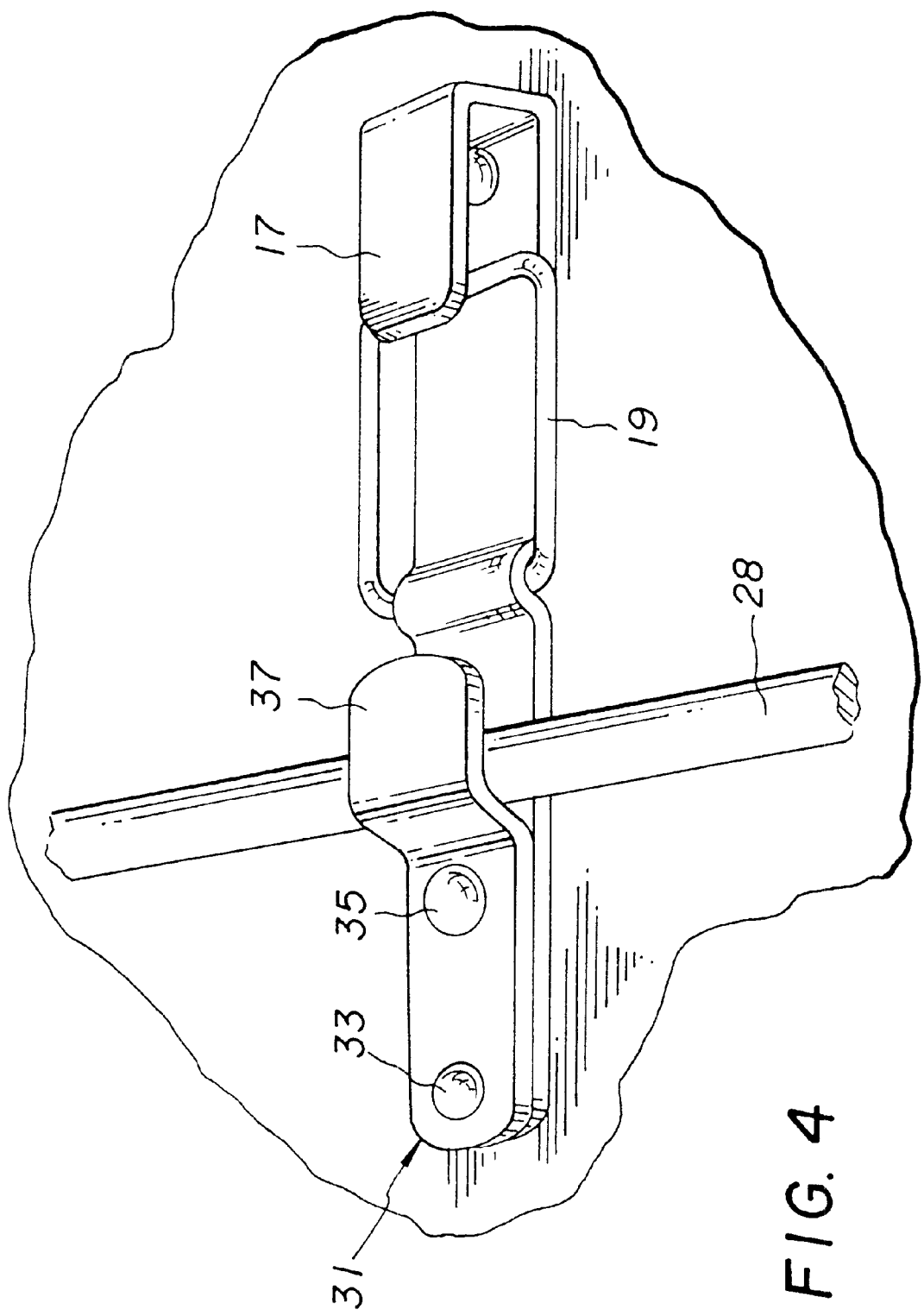
FIG. 4 discloses a close-up of the underside of the grill of the present invention in a collapsed condition.

FIG. 4 shows a detailed view of the underside of grill 10 in a collapsed condition. Storage latch 31 includes a detent 33 cooperating with the grill body 12 in a known manner to assist positioning the storage latch 31 in the closed position, securing cross bar 28. The storage latch 31 rotates about pivot 35 to release the cross bar 28. A bent handle portion 37 can be provided for leverage. Gate 19 can be formed as a rectangular link, pivotally secured to the grill body 12 at one end.

As illustrated in FIG. 4, loop 18 extends away from the collapsed grill and can be used for hanging the grill on smaller hooks or nails.

The invention can be adapted for use with existing grill bodies. In a preferred embodiment, the legs are formed from cold rolled commercial tubing.

The collapsed configuration is of the present invention is compact for shipping, storage, or transport and is ideally suited for easily being transported by a single person by grabbing handle 29 and rolling the grill 10 to a desired location on wheels 20. It is also an ideal way for consumers to transport the grill 10 out of a retail location after purchasing the grill 10. Handle 29 or loop 18 can also act as a support for hanging the grill in retail locations or at home.

Figure 5:
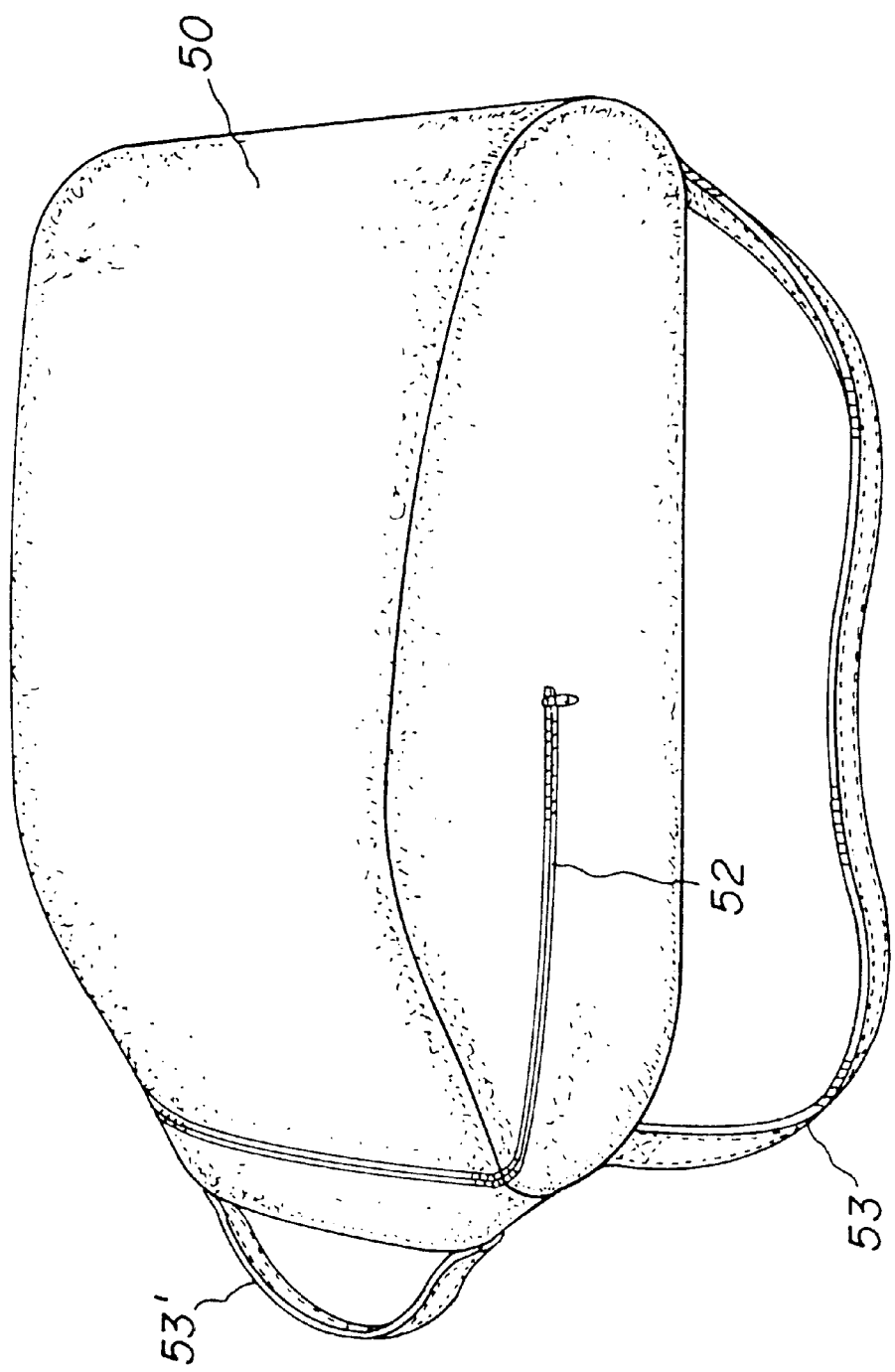
FIG. 5 discloses the grill of the present invention inside a storage cover.

FIG. 5 shows a cover 50 for the grill of the present invention. Closure 52, such as, but not limited to, a zipper, snaps, or hook-and-loop fastener, is opened and the grill is placed inside. The closure 52 is then shut to cover the grill for storage or transport. Straps 53, 53' can be included and used for hanging or carrying the combination.

The present invention has been described in terms of preferred embodiments, however, it will be appreciated that various modifications and improvements may be made to the described embodiments without departing from the scope of the invention as described.

We claim:

1. A method of providing a portable preassembled grill, comprising:

providing a grill body having front and rear portions;

pivotally attaching a first pair of support legs to the front portion of the grill body;

pivotally attaching a second pair of inverted U-shape support legs by pivots to opposing inner sides of a central portion of the first pair of support legs;

providing a loop on an upper part of said second pair of inverted U-shape support legs for engaging; and providing a catch at a rear portion of said grill body, wherein, in a collapsed state, the first pair of support legs and second pair of inverted U-shape support legs extend toward the rear of the grill body and, in an erected state, the loop of said second pair of inverted U-shape support legs engages said catch without tools to form a rigid, raised support base for the grill body.

2. The method of providing a portable preassembled grill of claim 1, further comprising providing a gate on said catch.

3. The method of providing a portable preassembled grill of claim 2, wherein said gate on said catch is gravity actuated.

4. The method of providing a portable preassembled grill of claim 2, further comprising providing means to secure said second pair of support legs to said grill body when in a collapsed state.

5. The method of providing a portable preassembled grill of claim 4, wherein said means to secure comprises a rotating latch on said grill body that engages a crossbar spanning said second pair of support legs.

6. The method of providing a portable preassembled grill of claim 1, further comprising attaching wheels to the lower portion of each of the first pair of support legs and providing a handle to the front of the grill body.

7. The method of providing a portable preassembled grill of claim 1, further comprising providing a lid hinged to the grill body.

8. The method of providing a portable preassembled grill of claim 7, further comprising providing a lid latch to secure said lid to said grill body.

9. The method of providing a portable preassembled grill of claim 1, wherein said loop is additionally used to hang said grill for storage.

10. The method of providing a portable preassembled grill of claim 1, further comprising merchandising the grills by hanging them for display.

11. The method of providing a portable preassembled grill of claim 1, further comprising inserting the grill into a storage cover for transport or storage.

12. The method of providing a portable preassembled grill of claim 1, further comprising transporting the grill from a retail location by rolling the grill on the wheels while in a collapsed condition.

13. The method of providing a portable preassembled grill of claim 6, wherein said handle is additionally used to hang said grill for storage.

14. A method of providing a portable preassembled grill, comprising:

providing a grill body having a front and rear portions;

pivotally attaching a first pair of support legs to the front portion of the grill body;

pivotally attaching a second pair of support legs by pivots to opposing inner sides of a central portion of the first pair of support legs; and providing a catch at a rear portion of said grill body, wherein, in a collapsed state, the first and second pair of support legs extend toward the rear of the grill body and, in an erected state, an upper part of said second pair of support legs engages said catch without tools to form a rigid, raised support base for the grill body, and further comprising providing means to secure said second pair of support legs to said grill body when in a collapsed state, wherein said means to secure comprises a rotating latch on said grill body that engages a crossbar spanning said second pair of support legs.

15. A portable preassembled grill, comprising:

a grill body having a front and rear portions;

a first pair of support legs pivotally attached to the front portion of the grill body;

a second pair of support legs attached by pivots to opposing inner sides of a central portion of the first pair of support legs and dimensioned to nest within said first pair of support legs when collapsed; and a catch at a rear portion of said grill body, wherein said second pair of support legs are formed in an inverted U-shape and further comprise a loop on an upper part of said second pair of support legs, and wherein, in a collapsed state, the nested first and second pair of support legs extend toward the rear of the grill body and, in an erected state, said loop engages said catch without tools to form a rigid, raised support base for the grill body.

16. The portable preassembled grill of claim 15, further comprising a gate on said catch.

17. The portable preassembled grill of claim 16, wherein said gate on said catch pivotally attached to the grill body at one end so as to be gravity actuated.

18. The portable preassembled grill of claim 16, further comprising means to secure said second pair of support legs to said grill body when in a collapsed state.

19. The portable preassembled grill of claim 18, wherein said means to secure comprises a rotating latch on said grill body that engages a crossbar spanning said second pair of support legs.

20. The portable preassembled grill of claim 15, further comprising wheels attached to the lower portion of each of the first pair of support legs and a handle on the front of the grill body.

21. The portable preassembled grill of claim 15, further comprising a lid hinged to the grill body.

22. The portable preassembled grill of claim 21, further comprising a lid latch to secure said lid to said grill body.

23. The portable preassembled grill of claim 15, wherein said loop is configured to hang said grill for storage.

24. The portable preassembled grill of claim 15, further comprising a storage cover for transport or storage.

25. The portable preassembled grill of claim 20, wherein said handle is configured to hang said grill for storage.

26. A portable preassembled grill, comprising:

a grill body having a front and rear portions;

a first pair of support legs pivotally attached to the front portion of the grill body;

a second pair of support legs attached by pivots to opposing inner sides of a central portion of the first pair of support legs and dimensioned to nest within said first pair of support legs when collapsed;

a catch at a rear portion of said grill body; and a rotating latch on said grill body that engages a crossbar spanning said second pair of support legs to secure said second pair of support legs to said grill body when in a collapsed state, wherein, in a collapsed state, the nested first and second pair of support legs extend toward the rear of the grill body and, in an erected state, an upper part of said second pair of support legs engages said catch without tools to form a rigid, raised support base for the grill body.

27. A method of providing a portable preassembled grill, comprising:

providing a grill body having a front and rear portions;

pivotally attaching a first pair of support legs to the front portion of the grill body;

pivotally attaching a second pair of support legs by pivots to opposing inner sides of a central portion of the first pair of support legs;

providing a catch at a rear portion of said grill body;

attaching wheels to the lower portion of each of the first pair of support legs; and providing a handle to the front of the grill body, wherein, in a collapsed state, the first and second pair of support legs extend toward the rear of the grill body and, in an erected state, an upper part of said second pair of support legs engages said catch without tools to form a rigid, raised support base for the grill body, and wherein said second pair of support legs extend beyond the wheels when in a collapsed state so as to allow the grill to be stored upright on said second pair of support legs, yet roll when tilted.

28. A portable preassembled grill, comprising:

a grill body having a front and rear portions;

a first pair of support legs pivotally attached to the front portion of the grill body;

a second pair of support legs attached by pivots to opposing inner sides of a central portion of the first pair of support legs and dimensioned to nest within said first pair of support legs when collapsed;

a catch at a rear portion of said grill body;

wheels attached to the lower portion of each of the first pair of support legs; and a handle on the front of the grill body wherein, in a collapsed state, the nested first and second pair of support legs extend toward the rear of the grill body and, in an erected state, an upper part of said second pair of support legs engages said catch without tools to form a rigid, raised support base for the grill body, and wherein said second pair of support legs are dimensioned so as to extend beyond the wheels when in a collapsed state so as to allow the grill to be stored upright on said second pair of support legs, yet roll when tilted.

* * * * *